F. G. BROCKETT.
SHUTTER MECHANISM FOR CAMERAS.
APPLICATION FILED DEC. 22, 1919.
1,378,936.
Patented May 24, 1921.
3 SHEETS—SHEET 2.
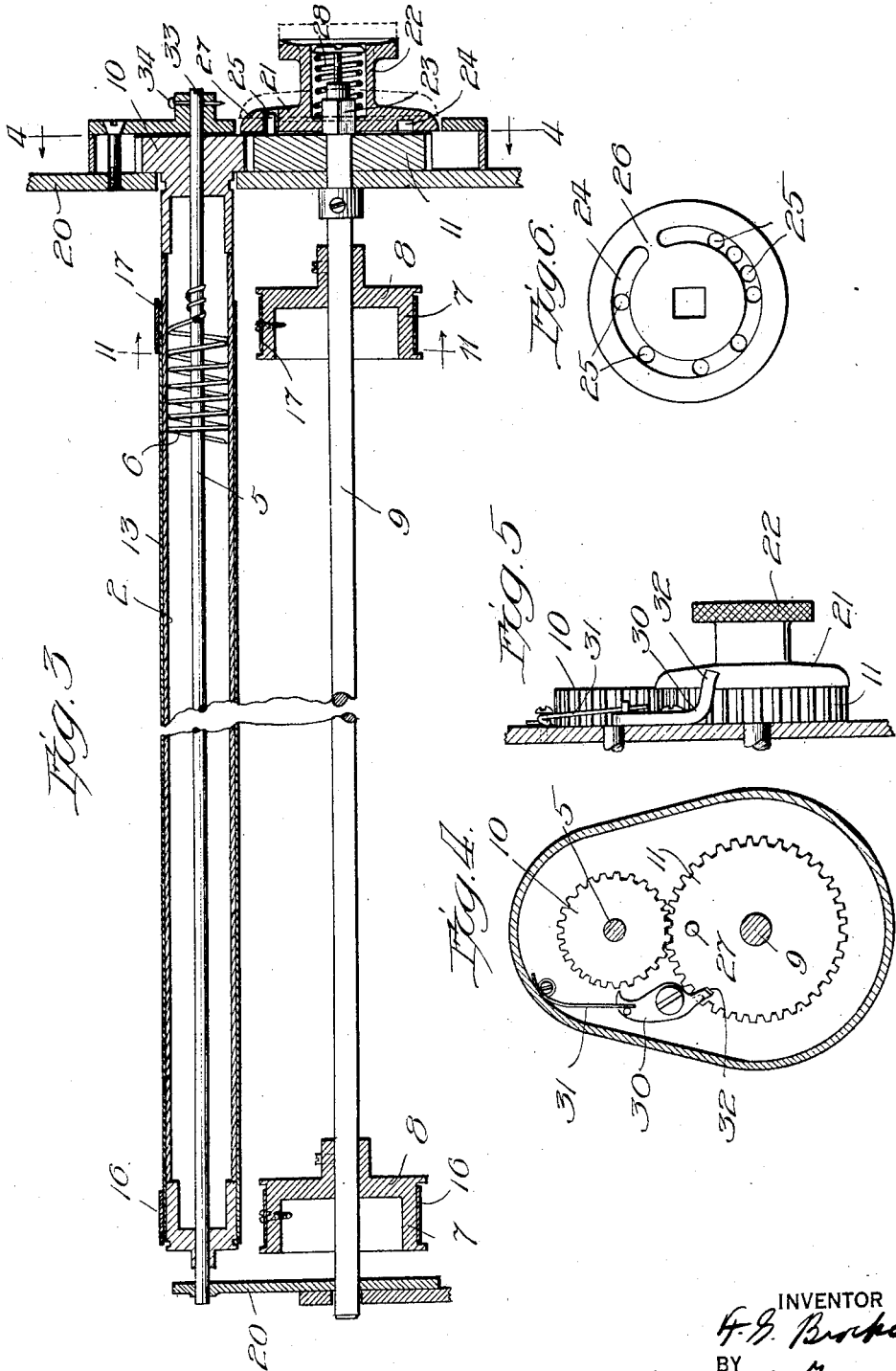
INVENTOR
F. G. Brockett
BY
Chamberlin Brandenreid
ATTORNEY

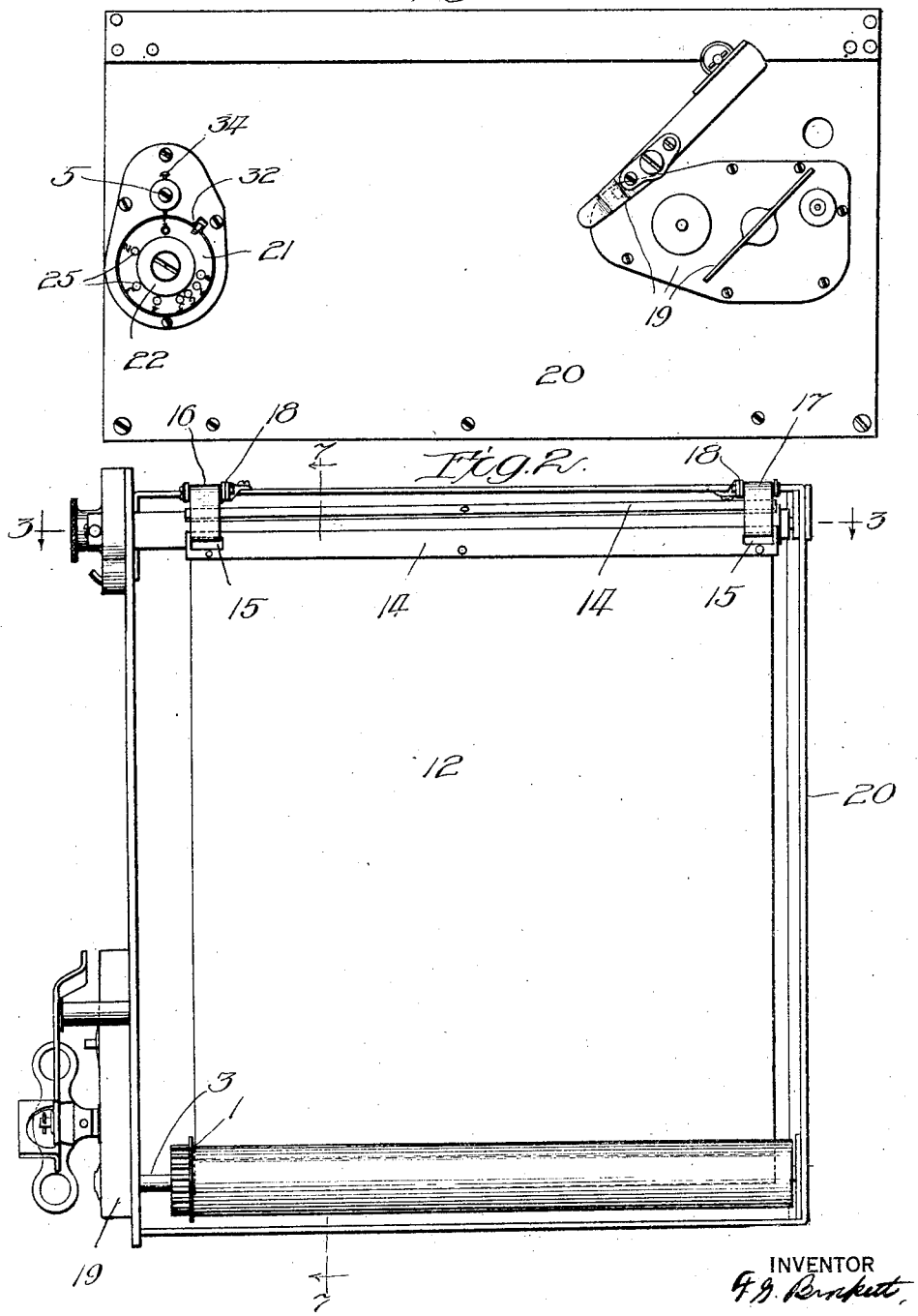

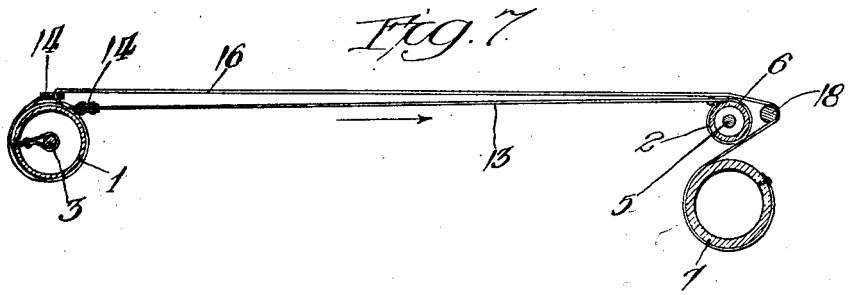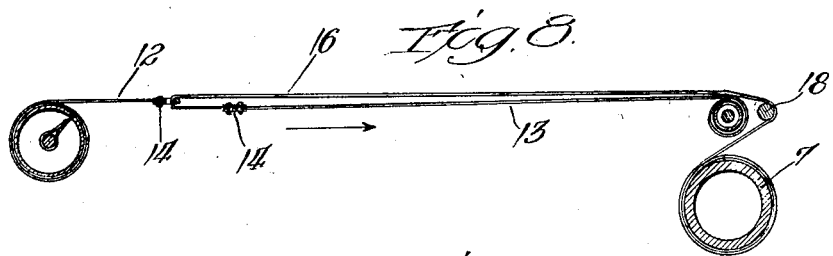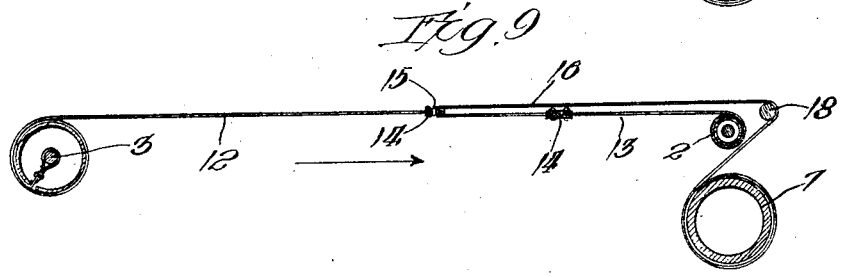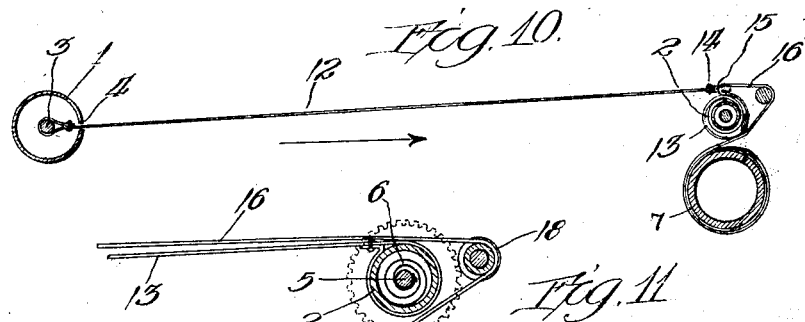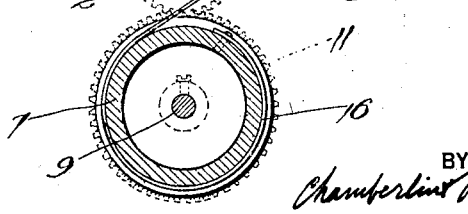

UNITED STATES PATENT OFFICE.

FREDERICK G. BROCKETT, OF CHICAGO, ILLINOIS.

SHUTTER MECHANISM FOR CAMERAS.

1,378,936. Specification of Letters Patent. Patented May 24, 1921.

Application filed December 22, 1919. Serial No. 346,460.

*To all whom it may concern:*

Be it known that I, FREDERICK G. BROCKETT, a citizen of the United States, residing at Chicago, county of Cook, State of Illinois, have invented a certain new and useful Improvement in Shutter Mechanism for Cameras, and declare the following to be a full, clear, and exact description of the same, such as will enable others skilled in the art to which it pertains to make and use the same, reference being had to the accompanying drawings, which form a part of this specification.

My invention has for its object to produce a simple and novel shutter mechanism containing a shutter of the curtain type which will always hold the curtain taut so as to prevent it from sagging, which will permit the shutter opening to be conveniently adjusted within comparatively wide limits, and which will automatically increase the size of the shutter opening as the speed of movement of the curtain increases.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is an end view of a shutter drawer for a camera adapted to be used in making photographs from an airplane or other air vehicle, embodying the present invention;

Fig. 2 is a top plan view of the drawer, those features of the usual drawer not having to do with the present invention being omitted;

Fig. 3 is a section on an enlarged scale taken approximately on line 3—3 of Fig. 2;

Fig. 4 is a section on line 4—4 of Fig. 3;

Fig. 5 is an elevation of the adjusting mechanism shown at the right hand side of Fig. 3, the housing therefor being omitted;

Fig. 6 is an inner face view of the adjusting disk;

Figs. 7, 8, 9 and 10 are sections taken approximately on line 7—7 of Fig. 2 showing various different positions of the curtain, only the curtain and the rollers therefor being illustrated; and Fig. 11 is a section on a larger scale corresponding to the right hand end of Fig. 7, the intermeshing gears between the two rollers there shown being indicated in dotted lines.

Referring to the drawings, 1 and 2 represent two parallel rollers spaced apart a distance somewhat greater than the length of the plate for which the camera is designed. The roller, 1, comprises a tubular member fixed upon a shaft, 3, extending axially through the same. A slot, 4, extends through the wall of the tube from end to end and parallel with the axis. The roller, 2, is in the form of a tubular member axially of which extends a shaft, 5, and there being a spring, 6, between the shaft and the tubular member as in an ordinary curtain roller. The shaft is stationary so that the rotation of the tubular member of the roller is under the control of the spring. Just below the roller 2 and parallel therewith is a third roller, 7, which is approximately twice the diameter of the roller 2. The roller, 7, is required only for the purpose of winding up two narrow tapes to be hereinafter explained and it may therefore conveniently take the form of a pair of flanged drums, 8, fixed to a shaft, 9, as best illustrated in Fig. 3. The shaft, 9, and the roller, 2, are geared together by means of a pinion, 10, fixed to the roller 2 and a gear wheel, 11, on the shaft, 9; the wheel, 11, having twice the number of teeth as the pinion 10 so that the roller 2 will make two revolutions while the flanged drums, 8, are making one revolution.

The curtain is made in two sections. One section, 12, extends at one end through the slot, 4, in the roller 1 where it is looped around the shaft, 3, and then fastened to the body of the curtain. The other section, 13, is fastened at one end in any suitable way to the spring roller 2. Each curtain section is sufficiently long to span the gap between the rollers 1 and 2. The free edge of each of the curtain sections is provided with a binding strip, 14, preferably of metal. Near the ends of the binding strip of the section 12 are a pair of holes or slots, 15, about as long as the axial length of the drums, 8, and each arranged in the same plane at right angles to the axes of the rollers as one of said drums. Two tapes, 16 and 17, are attached to the free end of the curtain section, 13, are passed through the slots or holes, 15, in the binding strip of the other curtain section, and are then passed over the top of the curtain section, 13, over guiding rollers, 18, beyond the roller, 2, and thence down to the drums. Normally the section, 12, of the curtain is wound upon the roller 1, any suitable winding and release mechanism, such as indicated at 19 in Fig. 2, being provided for this latter roller. At this time the binding strip on the free edge of the section, 13, of the curtain rests upon the roller 1 as shown in Fig. 7, so that no light can go upwardly past the curtain. In order to bring the parts into these positions, the spring in the roller 2 has been placed under tension so that, when the roller 1 is released, the spring acts to wind up the curtain section, 13, on the roller 2 and unwind the section, 12, from the roller 1. The roller 2 and the roller 7, (that is the drums, 8,) are geared together so that the tapes are wound and unwound in unison with the section, 13, of the curtain. The shutter opening is between the binding strips at the meeting ends of the curtain sections and this opening travels across the distance between the rollers 1 and 2 during the exposure of the plate, so that the latter is exposed progressively from one end to the other. At the end of an exposure, the section, 13, of the curtain is completely wound upon the spring roller 2 while the section, 12, spans the distance between the rollers 1 and 2 and has its binding strip resting upon the latter roller as illustrated in Fig. 10. It will be seen that in all positions of the curtain sections they are under the influence of the spring in the spring roller so that the curtain is at all times held taut and thus prevented from sagging so as to interfere with the doors usually employed below the curtain and also insuring that no gap will be left at the ends or at either side through which light may filter.

In passing from the condition illustrated in Fig. 7 to that illustrated in Fig. 10, the curtain starts from a position of rest and travels at an accelerated speed while an exposure is being made. Consequently with a shutter opening of constant area that portion of the plate which is opposite the shutter opening at the beginning of the exposure will be exposed to the action of the light longer than any other part of the plate, while that portion of the plate which is opposite the shutter opening just before the end of the shutter movement will be exposed for a shorter period of time than any other portion. In order to avoid lack of uniformity of exposure throughout the length of a plate I have so constructed and arranged the parts that the shutter opening will be gradually increased in length as the opening travels across the space between the rollers 1 and 2 in making an exposure. This is accomplished by making the ratio between the diameters of the roller, 2, and the tape drums somewhat greater than the ratio between the gears which connect these elements together. In other words, if the ratio between the teeth and the gearing is as 1 to 2, then the ratio between the diameters of the roller, 2, and the drums should be as 1 to a fraction less than 2. Therefore, when the section, 13, of the curtain, and the tapes are being wound up, the curtain section will be wound up somewhat more rapidly than the tapes and consequently the curtain section, 12, will be allowed to lag a little and thus produce a gradually increasing length of shutter opening; the proportions being made such that the size of the shutter opening increases at such a rate as to compensate for the increased speed of the shutter.

The parts heretofore described are all supported in any suitable way in a suitable frame structure, 20, which may take the form of a removable drawer now being employed in some forms of airplane cameras.

In addition to the automatic variation in the size of the shutter opening it is necessary to provide means for initially adjusting the size of the opening to suit the light conditions under which exposures are to be made. This may conveniently be accomplished by simply winding up or unwinding the tapes while the spring roller is being held stationary. In the arrangement illustrated this is done as follows: The gear wheel, 11, is loose on the shaft 9. On the outer end of the shaft 9, beyond the gear wheel, is a disk, 21, provided with a head or handle, 22, for turning the same. The disk is mounted on a square portion, 23, of the shaft or is otherwise connected thereto so that it must rotate with the shaft while being free to move lengthwise of the latter. In the face of the disk next to the gear wheel is a groove, 24, through the bottom of which are bored a series of holes, 25, distributed at intervals along the same. Between two of the holes is a stop, 26, arranged in or forming a barrier across the groove. The gear wheel, 11, is provided with a short projecting pin, 27, so located that it will extend into the groove in the disk and, when the disk lies close to the gear, will enter one of the openings, 25, when the latter is brought opposite the pin. A spring, 28, between the shaft, 9, and the disk, tends constantly to hold the disk against the side of the gear wheel as shown in full lines in Fig. 3. When it is desired to vary the initial size of the shutter opening, the disk is pulled outwardly into the position indicated in dotted lines in Fig. 3 sufficiently far to withdraw the pin, 27, from the hole in which it may have been seated, but not sufficiently far to carry the pin entirely out of the groove. The disk may therefore be turned independently of the gear wheel, turning the shaft, 9, with it and winding up or unwinding the tapes without correspondingly winding up or unwinding the curtain section, 13; the spring rollers, 2, being during this time locked in the manner which I shall now explain. For the purpose of locking the spring roller while the size of the shutter opening is being adjusted, I have provided a pawl, 30, which is best shown in Figs. 4 and 5. This pawl is adapted to lock the pinion, 10, and therefore the spring roller, but is normally held out of locking position by means of a spring, 31. The tail of the pawl is provided with a finger, 32, extending outwardly past the periphery of the disk, 21, and inclined in such a direction that when the disk is pulled outwardly to unlock the gear wheel, 11, from the shaft, 9, it engages the part, 32, of the pawl and swings the pawl into its locking position where it is held while the disk is being turned to bring the pin, 27, opposite the desired hole in the disk; whereupon, upon releasing the disk so as to permit it to resume its normal position, the pawl is also released and the mechanism is again ready for service. The holes, 25, are preferably provided with suitable indicating characters placed beside them on the outer face of the disk as illustrated in Fig. 1 so that the operator can instantly adjust the size of the shutter opening without viewing the opening itself. The barrier or stop, 26, heretofore described is adapted to engage with the pin, 27, so as to prevent the disk from being rotated through more than a complete turn; the parts being so proportioned that somewhat less than the complete turn of the adjusting disk will give as great a variation in the initial size of the shutter opening as will be required. If this stop or barrier were not present the operator could not tell without withdrawing the drawer and looking at the shutter, whether it was necessary to rotate the disk through only a fraction of a turn or whether it would be necessary to rotate the disk through more than a complete turn.

For the purpose of adjusting the tension of the spring in the spring roller, I have provided the shaft, 5, with a notch, 33, in the end thereof, into which notch a screw driver or other tool may be inserted for the purpose of turning the shaft. Normally, the shaft is held in a fixed position by means of a pin, 34, passing through the same and through a stationary part of the supporting frame. When it is desired to adjust the tension of the spring, the pin, 34, is removed, the shaft is turned the desired number of turns, and the pin is again placed in position.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims. Furthermore, in the claims I use the word "tapes" to indicate any flexible cord, cable or band.

I claim:

1. A camera shutter comprising two curtain sections arranged end to end, rollers to which the remote ends of said sections are attached; tapes fastened to the free end of one section, passing around guides on the free end of the other section and extending back lengthwise over the first section; a roller to which the other ends of the tapes are fastened; and gearing between the tape roller and the roller to which is attached the curtain section to which the ends of the tapes are fastened; the parts being so proportioned and arranged that the tapes are wound up and unwound more slowly than the curtain section attached to the roller to which the tape roller is geared so as to increase the size of the shutter opening during the opening movement of the shutter.

2. A camera shutter mechanism comprising a setting roller and a spring roller parallel with each other, two curtain sections arranged end to end and each fastened to one of said rollers, the length of each section being sufficient to span the distance between said rollers, tapes fastened at one end to the free end of the curtain section attached to the spring roller, guides on the free end of the other curtain section engaging and forming a running connection with the tapes, a tape roller arranged in the vicinity of the spring roller and having the other ends of the tapes secured thereto, and gearing between the tape roller and the spring roller, the parts being so proportioned and arranged that the tapes are wound up and unwound more slowly than the curtain section attached to the spring roller so as to increase the size of the shutter opening during the opening movement of the shutter.

3. A camera shutter mechanism comprising a setting roller and a spring roller parallel to each other, two curtain sections arranged end to end and each fastened to one of said rollers, the length of each section being sufficient to span the distance between said rollers, tapes fastened at one end to the free end of the curtain section attached to the spring roller, guides on the free end of the other curtain section engaging and forming a running connection with the tapes, a tape roller arranged in the vicinity of the spring roller and having the other ends of the tape secured thereto, and gearing between the tape roller and the spring roller so proportioned that the tapes are wound up so much more slowly than the curtain attached to the spring roller is wound up by the latter in making an exposure that the opening between the adjacent edges of the two curtains is increased in size as the curtains gain momentum in starting from a position of rest to make an exposure.

In testimony whereof, I sign this specification.

FREDERICK G. BROCKETT.